C. Leicht,
Billiard Cue,
No. 531. Reissued Feb. 23, 1858.
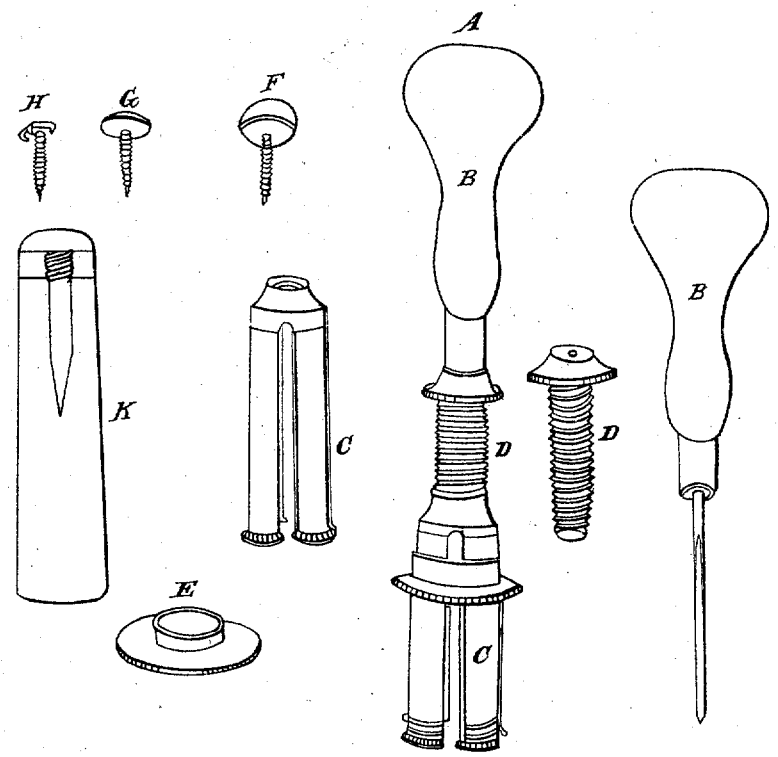
AM. PHOTO-LITHO. CO. N.Y. (OSBORNE'S PROCESS)

UNITED STATES PATENT OFFICE.

CONRAD LEICHT, OF NEW YORK, N. Y.

IMPROVEMENT IN BILLIARD-CUES.

Specification forming part of Letters Patent No. 14,964, dated May 27, 1856; Reissue No. 531, dated February 23, 1858.

*To all whom it may concern:*

Be it known that I, CONRAD LEICHT, of the city of New York, in the county and State of New York, have invented a new and improved mode of manufacturing, producing, and adjusting billiard and other cue tops, thereby preventing the same, as heretofore generally the case, of displacing themselves or falling off entirely.

To enable others skilled in the art to make and use my invention, I will proceed to describe its construction and operation.

Figure A of the accompanying drawings represents the machine in all its parts and natural size, with which I adjust said cue-tops. The same consists of different parts, as following description will show.

Fig. C is a brass tube, the lower part of which is divided in four equal parts, allowing to be expanded or contracted according to the size of the cue to undergo my process. The contracting of the tube C I produce by sliding the conical ring E toward the lower part of tube C, thereby holding firm the cue or the leather top piece inserted into the tube C. The top of the tube C is provided with an opening admitting the screw D, the center of which is provided with an opening forming a center hole through the whole screw. When the cue to be topped is inserted into the tube, as above described, I screw down the screw D until the same reaches the surface of the cue. When in that position I insert the gimlet B through the opening of screw D, until the handle comes in contact with the head of the screw, this being the depth required, and thus making all holes uniform into the cue. In the same manner I fix the leather cue-top K with its wooden part toward the top of the tube C, and insert a similar gimlet of a length to give the required depth, whereby the hole will be made exactly in its center and said leather cue-top will afterward, when fastened upon the cue-top, correspond and exactly fit on the same.

The construction of my tops is essentially different from those in use at present. Although they do not differ in the material, these tops are generally made of and are made in two different ways.

In order to prevent their falling off or displacing themselves, the one plan I adopt is as follows: I take two layers of leather, the first one, as represented in Fig. G, provided with the small screw H. The four corners of the head of said screw H are bent downward and terminate in sharp points, which, by the least pressure, enter into the body of the leather. When the first layer of leather is thus provided with the screw H, I then affix the top layer or second part of cue-top in any suitable manner or way, after which said leather tops are screwed upon the top of the cue, which has been already bored in the manner above described.

My second plan consists in fixing the small screw into the center of the cue-top, and affix the two layers of leather upon a small piece of wood in the usual manner, and bore a hole corresponding to the screw in the cue-top through said lower wooden part of the leather top in the above-described manner, and fix said top in that manner upon the cue-top.

The essential difference between my tops and others commonly used is that I affix them to the cues by means of a screw, thereby utterly preventing their falling off, and of admitting at any time to replace said tops at a moment's notice.

Fig. F represents a complete cue-top as by me used.

What I claim as my invention, and desire to secure by Letters Patent, is—

My mode of providing said cue-tops or the cues with screws, and adjusting them to each other in the manner as above substantially described.

CONRAD LEICHT.

Witnesses:

HENRY E. ROEDER,

H. HELSSE.